US011035532B2

(12) United States Patent
Qiao et al.

(10) Patent No.: US 11,035,532 B2
(45) Date of Patent: Jun. 15, 2021

(54) RING-SHAPED LIGHT-DISTRIBUTION COMPONENT, LIGHT SOURCE MODULE, LIGHT SOURCE ASSEMBLY, AND LIGHTING FIXTURE (71) Applicant: OPPLE LIGHTING CO., LTD., Shanghai (CN)

(72) Inventors: Shengjie Qiao, Shanghai (CN); Guolong Ni, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/911,384

(22) Filed: Jun. 24, 2020

(65) Prior Publication Data
US 2020/0326045 A1 Oct. 15, 2020

Related U.S. Application Data (63) Continuation of application No. PCT/CN2018/123840, filed on Dec. 26, 2018.

(30) Foreign Application Priority Data

Dec. 26, 2017 (CN) .......................... 201711438604.4

(51) Int. Cl.
*F21V 5/04* (2006.01)
*F21S 4/28* (2016.01)
(Continued)

(52) U.S. Cl.
CPC .................. *F21S 4/28* (2016.01); *F21K 9/20* (2016.08); *F21K 9/69* (2016.08); *F21V 5/00* (2013.01);
(Continued)

(58) Field of Classification Search
CPC .......... F21V 29/83; F21V 29/20; F21V 29/69; F21V 5/00; F21V 5/04; F21V 17/04;
(Continued)

(56) References Cited

U.S. PATENT DOCUMENTS 6,910,791 B2 * 6/2005 Futami .................... F21S 41/43
362/517
7,055,999 B2 * 6/2006 Lin ...................... B60Q 1/0052
362/511
(Continued)

FOREIGN PATENT DOCUMENTS

CN 102840544 A 12/2012
CN 105258041 A 1/2016
(Continued)

OTHER PUBLICATIONS

International Search Report of PCT Application No. PCT/CN2018/123840 dated Apr. 1, 2019, (6p).

*Primary Examiner* — Arman B Fallahkhair
(74) *Attorney, Agent, or Firm* — Arch & Lake LLP (57) ABSTRACT A ring-shaped light-distribution component includes a light-distribution component body that has a ring-shaped accommodation space and a light incident surface and a light emergent surface respectively located on two sides of the light-distribution component body. The ring-shaped accommodation space accommodates at least two light-emitting units distributed along its circumference. An inner wall of the ring-shaped accommodation space is the light incident surface, the light incident surface including an inner light incident surface near the center of the ring light-distribution component and an outer light incident surface away from the center. A deflection angle of light projected by the light-emitting unit and deflected by a portion of the light-distribution component body corresponding to the inner light incident surface is a first deflection angle, and a deflection angle of light deflected by a portion of the light-distribution component body corresponding to the outer light incident surface is a second deflection angle.

17 Claims, 9 Drawing Sheets (51) Int. Cl.
*F21K 9/69* (2016.01)
*F21V 17/04* (2006.01)
*F21V 17/10* (2006.01)
*F21V 17/12* (2006.01)
*F21V 17/16* (2006.01)
*F21K 9/20* (2016.01)
*F21V 5/00* (2018.01)
*F21V 19/00* (2006.01)
*F21V 21/096* (2006.01)
*F21V 23/00* (2015.01)
*F21V 29/83* (2015.01)
*F21Y 103/33* (2016.01)
*F21Y 115/10* (2016.01)

(52) U.S. Cl.
CPC ............... *F21V 5/04* (2013.01); *F21V 17/04* (2013.01); *F21V 17/105* (2013.01); *F21V 17/12* (2013.01); *F21V 17/164* (2013.01); *F21V 19/001* (2013.01); *F21V 21/096* (2013.01); *F21V 23/003* (2013.01); *F21V 29/83* (2015.01); *F21Y 2103/33* (2016.08); *F21Y 2115/10* (2016.08)

(58) Field of Classification Search
CPC ...... F21V 17/105; F21V 17/12; F21V 17/164; F21V 19/001; F21V 21/096; F21V 23/003
See application file for complete search history.

(56) References Cited

U.S. PATENT DOCUMENTS

| | | | | |
|---|---|---|---|---|
| 7,144,144 | B2 * | 12/2006 | Hsu | ....................... B60Q 1/0052 362/543 |
| 7,290,909 | B2 * | 11/2007 | Komatsu | ............... F21S 41/255 362/538 |
| 9,062,845 | B1 * | 6/2015 | Tsai | ........................ F21S 43/14 |
| 9,157,607 | B2 | 10/2015 | Wang et al. | |
| 9,827,898 | B2 * | 11/2017 | Chen | ....................... F21S 43/26 |
| 9,880,417 | B2 * | 1/2018 | Jongewaard | ....... G02B 19/0061 |
| 10,378,722 | B2 * | 8/2019 | Grosdidier | ............... B60Q 3/80 |
| 10,520,159 | B1 * | 12/2019 | Tsai | ........................ F21S 43/14 |
| 2010/0039824 | A1 * | 2/2010 | Wang | .................. B60Q 1/0052 362/310 |
| 2014/0056006 | A1 | 2/2014 | Jongewaard et al. | |
| 2018/0363881 | A1 | 12/2018 | Zou et al. | |

FOREIGN PATENT DOCUMENTS

| | | |
|---|---|---|
| CN | 105627171 A | 6/2016 |
| CN | 106704887 A | 5/2017 |
| CN | 107965682 A | 4/2018 |
| CN | 107975685 A | 5/2018 |
| CN | 207906868 U | 9/2018 |
| CN | 207906869 U | 9/2018 |

* cited by examiner

RING-SHAPED LIGHT-DISTRIBUTION COMPONENT, LIGHT SOURCE MODULE, LIGHT SOURCE ASSEMBLY, AND LIGHTING FIXTURE

CROSS-REFERENCE

The present application is based on and claims priority to PCT Patent Application No. PCT/CN2018/123840 filed on Dec. 26, 2018 which claims priority of the Chinese Patent Application No. CN201711438604.4, filed on Dec. 26, 2017, the entire disclosure of which are incorporated herein by reference as part of the present application for all purposes.

TECHNICAL FIELD

The present application relates to the technical field of fixture design, particularly to a ring-shaped light-distribution component, a light source module, a light source assembly, and a lighting fixture.

BACKGROUND

As people have higher and higher requirements for environmental lighting, the performance of lighting fixtures has also been greatly improved. At present, there are many types of lighting fixtures, and ring-shaped lighting fixtures are common ones. A round of light-emitting units (such as LED lamps) are arranged in this type of lighting fixtures, and light-distribution components are arranged on the light-emitting units to realize light emitting divergently.

However, in the actual use process, under the effect of the light-distribution component, each light-emitting unit projects light toward the center of the lighting fixture, and these light rays are superimposed on the center of the lighting fixture, thereby making the center of the lighting fixture extremely bright, while other parts of the lighting fixture, especially the parts near the edge of the lighting fixture, are darker. Apparently, the lighting fixtures of this structure have the problem of uneven light emission, which directly affects the lighting effect.

In addition, in the process of assembling the light-distribution component of the lighting fixture with the chassis of the lighting fixture, a threaded connection is usually used to connect them by screwing the fasteners. During the assembly process, the operation is cumbersome and affects the user's use.

SUMMARY

The present application provides a ring-shaped light-distribution component to solve the problem of uneven illumination of current ring-shaped lighting fixtures.

In order to solve the above problems, this application uses the following technical schemes.

A ring-shaped light-distribution component comprises a light-distribution component body, the light-distribution component body having a ring-shaped accommodation space and a light incident surface and a light emergent surface respectively located on two sides of the light-distribution component body, the ring-shaped accommodation space being configured for accommodating at least two light-emitting units distributed along its circumference, an inner wall of the ring-shaped accommodation space being the light incident surface, the light incident surface including an inner light incident surface near a center of the ring-shaped light-distribution component and an outer light incident surface away from the center, a deflection angle of light, which is projected by the light-emitting unit, deflected by a portion of the light-distribution component body corresponding to the inner light incident surface being a first deflection angle, a deflection angle of light deflected by a portion of the light-distribution component body corresponding to the outer light incident surface being a second deflection angle, and the first deflection angle being smaller than the second deflection angle.

BRIEF DESCRIPTION OF THE DRAWINGS

The drawings described here are used to provide a further understanding of the present application and form a part of the present application. The schematic embodiments and descriptions of the present application are used to explain the present application and do not constitute an undue limitation on the present application, in which.

DETAILED DESCRIPTION

Description of Reference Signs

100—light-distribution component, 110—light-distribution component body, 110'—light-distribution component body, 110"—light-distribution component body, 111—accommodation space, 111'—accommodation space, 111"—accommodation space, 112—light incident surface, 112a—inner light incident surface, 112b—outer light incident surface, 112c—top portion boundary, 113—light emergent surface, 120—positioning portion, 121—positioning groove, 122—heat dissipation groove, 130—fastening part, 130'—fastening part, 130"—fastening part, 131—elastic buckle, 132—limiting portion, 133—spare connection hole, 140—lug, 200—light-emitting unit, 300—chassis, 310—substrate, 311—sub-substrate, 312—electrical connection part, 320—snap-fit recess, 330—guide recess, 400—lampshade, 500—mixing cavity, 600—driver.

In order to make objects, technical schemes and advantages of the embodiments of the present disclosure clearer, the technical schemes of the embodiments will be described in a clearly and fully understandable way in connection with the drawings related to the embodiments of the present disclosure. It is apparent that the described embodiments are just a part but not all of the embodiments of the present disclosure. Based on the described embodiments herein, one of ordinary skill in the art can obtain other embodiment(s), without any creative work, which shall be within the scope of the present disclosure.

The technical schemes provided by the embodiments of the present application will be described in detail below in conjunction with the drawings.

Referring to FIGS. 1-9, an embodiment of the present application discloses a light-distribution component 100, the disclosed light-distribution component 100 can cover the light-emitting units 200 of the lighting fixture, so that the light projected by the light-emitting units 200 can pass through the light-distribution component, so as to distribute the light emitted by the light-emitting units 200.

The disclosed light-distribution component 100 may include a light-distribution component body 110, which is the body member of the light-distribution component 100, which can provide a mounting foundation for other components of the light-distribution component 100, and can also provide an accommodation space 111 for the light-emitting units 200. Specifically, the light-distribution component 100 may be a ring-shaped light-distribution component, and the ring-shaped light-distribution component may be installed on at least two light-emitting units 200 arranged in a circle on the lighting fixture. Correspondingly, the accommodation space 111 of the ring-shaped light-distribution component is a ring-shaped accommodation space.

In the embodiment of the present application, the light-distribution component body 110 may have an accommodation space 111 and a light incident surface 112 and a light emergent surface 113 respectively located on two sides of the light-distribution component body 110.

The accommodation space 111 is configured for accommodating the light-emitting units 200. The inner wall of the accommodation space 111 is the light incident surface 112, and the outer wall of the accommodation space 111 is the light emergent surface 113. In a specific embodiment, on the premise that the accommodation space 111 is a ring-shaped accommodation space, the ring-shaped accommodation space can accommodate at least two light-emitting units 200 distributed along the circumferential direction of the ring-shaped accommodation space.

The light incident surface 112 of the light-distribution component 100 may include an inner light incident surface 112a and an outer light incident surface 112b. The inner light incident surface 112a is located inside the outer light incident surface 112b. It can be understood that the distance of the inner light incident surface 112a to the center of the lighting fixture is smaller than that of the outer incident surface 112b to the center of the lighting fixture.

In a specific embodiment, on the premise that the light-distribution component 100 is a ring-shaped light-distribution component, the light-incident surface 112 may include an inner light-incidence surface 112a near the center of the ring-shaped light-distribution component and an outer light incident surface 112b away from the center of the ring-shaped light-distribution component.

In the present application, the light emitted by the light-emitting units 200 may enter the light-distribution component body 110 from the light incident surface 112 and then exit from the light emergent surface 113. The deflection angle of light, which is projected by the light-emitting units 200, deflected by a portion of the light-distribution component body 110 corresponding to the inner light incident surface 112a is the first deflection angle a, and the deflection angle of light deflected by a portion of the light-distribution component body 110 corresponding to the outer light incident surface 112b is the second deflection angle b, and the first deflection angle a may be smaller than the second deflection angle b. Here, a first deflection light that is projected by the light-emitting unit and deflected by a portion of the light-distribution component body corresponding to the inner light incident surface 112a defines a first deflection angle a. The second deflection light deflected by a portion of the light-distribution component body corresponding to the outer light incident surface 112b defines a second deflection angle b.

In the light-distribution component 100 disclosed in the embodiments of the present application, the light-distribution component body 110 covers the light-emitting units 200, and the light emitted by the light-emitting units 200 enters the light-distribution component body 110 from the light incident surface 112, the first deflection angle a of light deflected by a portion on the light-distribution component body corresponding to the inner light incident surface is small, while the second deflection angle b of light deflected by a portion of the light-distribution component body corresponding to the outer light incident surface is large. In this case, more of the light rays will be projected away from the edge of the center of the ring-shaped light-distribution component, so that the light concentrated inside the ring-shaped light-distribution component is less, which can finally improve the light emission uniformity of the lighting fixture.

Of course, on the premise that the light-distribution component 100 is a ring-shaped light-distribution component, the relationship between the first deflection angle a and the second deflection angle b can make the central light converging on the ring-shaped light distribution component less, and thus can improve the uniformity of light emission of the lighting fixture, thereby reducing the brightness difference of the light surface formed after passing the ring-shaped light distribution component.

In the light-distribution component 100 disclosed in the embodiments of the present application, the light-distribution component body 110 may include a plurality of accommodation spaces 111, or may include one accommodation space 111. Each accommodation space 111 may cover at least two light emitting units 200 to distribute light, and each accommodation space 111 may cover a single light-emitting unit 200. For example, for the light-distribution component 100 being a ring-shaped light-distribution unit, the accommodation space 111 is a ring-shaped accommodation space. In this case, compared to using a light-distribution component for each light-emitting unit 200 to implement individual light distribution, the ring-shaped light distribution component with this configuration has a smaller volume, fewer consumables, and lower manufacturing costs, and the overall light distribution for at least two light emitting units 200 can be achieved by installing one ring-shaped light-distribution component, which will undoubtedly improve the light distribution efficiency, and the assembly efficiency of the light distribution component 100 can also be improved.

In addition, the ring-shaped accommodation space is configured to accommodate at least two light-emitting units 200. Because the ring-shaped accommodation space is a ring-shaped space, the light-emitting units 200 can be arranged more freely, which is convenient for users to assemble the light-emitting units 200 of different densities. The ring-shaped light distribution components disclosed in the embodiments can better meet more lighting requirements of users.

Because the first deflection angle a can be smaller than the second deflection angle b, the light-distribution component 100 disclosed in the embodiments of the present application can allow more light rays to be projected toward the periphery of the light-distribution component 100, so the light-distribution unit disclosed in the present application 100 has a wider light-distribution coverage, and users can match lampshades of different size ranges on a same size chassis 300. It can be seen that the light-distribution component 100 disclosed in the embodiments of the present application, especially the ring-shaped light-distribution component, can suitable to lighting fixtures in many size ranges and has better adaptability.

Figure 3:
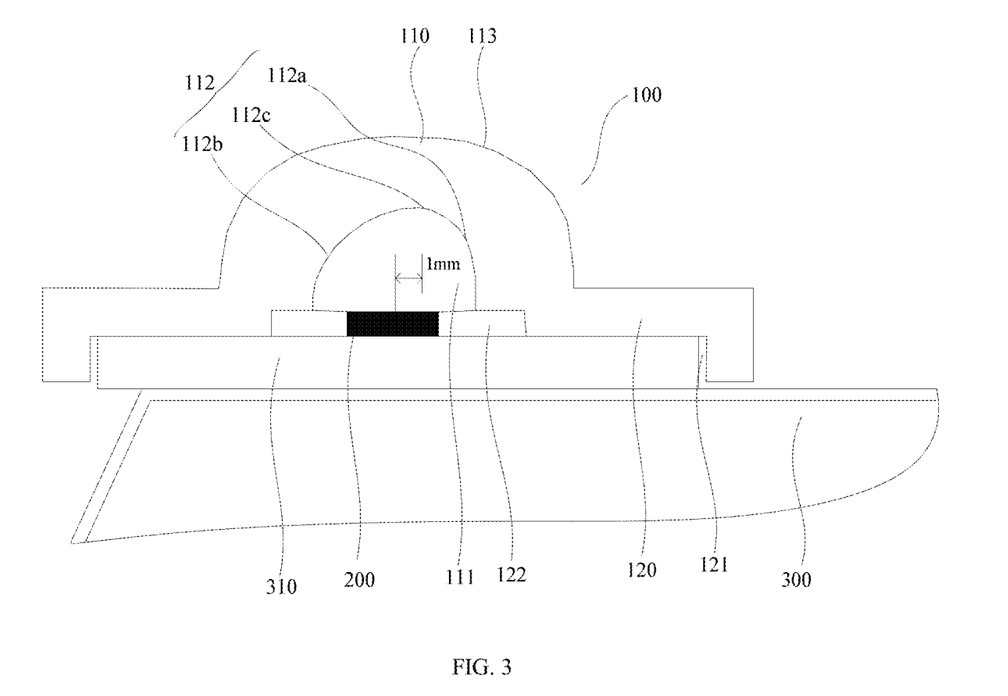
FIG. 3 is a partial cross-sectional view of a lighting fixture disclosed in an embodiment of the present application.

Both the light incident surface 112 and the light emergent surface 113 may be curved surfaces. As shown in FIG. 3, the radius of curvature of the inner light incident surface 112a may be smaller than the radius of curvature of the outer light incident surface 112b. The deflection angles may be adjusted by adjusting the curvatures of the inner light incident surface 112a and the outer light incident surface 112b. The light emergent surface 113 may be a symmetric curved surface. Herein, the light emergent surface 113 is a symmetric curved surface, which refers to the inner and outer surfaces of the light emergent surface 113 are symmetrical.

The light-distribution component 100 disclosed in the embodiments of the present application may be an integrated structural member made of a light-transmitting material. Specifically, the light-distribution component 100 may be formed from PC (Polycarbonate) material by an injection molding process.

On the premise that the light incident surface 112 is a curved surface, in a specific embodiment, the light incident surface 112 may have a top portion boundary 112c that is at a maximum distance from the light-emitting units 200. The region of the light incident surface 112 inside the top portion boundary 112c is the inner light incident surface 112a, and the region of the light incident surface 112 outside the top portion boundary 112c is the outer light incident surface 112b. It is to be noted that, in this application, the top boundary 112c refers to a connection line of apexes of the curves formed by the light incident surface 112 along the lateral cross sections of the light-distribution component 100. Directions of the cross-sections are the same as the projecting directions of the light rays by the light-emitting units 200. Of course, the inner light incident surface 112a and the outer light incident surface 112b can also be demarcated by other structures, as long as the size relationship between the first deflection angle a and the second deflection angle b can meet the requirements in the above-described embodiments of the present application.

On the premise that the light-distribution component 100 is a ring-shaped light-distribution component, as shown in FIG. 3, the top boundary 112c may be located inside the same circumference where the optical axes of all the light-emitting units 200 are located, and the top boundary 112c and the circumference where all the optical axes are located are distributed concentrically, and the distance between the top boundary 112c and the circumference is a given distance, which is greater than zero. Specifically, the distance between the top portion boundary 112c and the circumference where all optical axes are located may be 1 mm.

In order to make the light output of the lighting fixture more uniform, in an embodiment of the present application, the surface of the light output surface 113 may be provided with a diffusion pattern.

Referring to FIG. 3 or 4 again, the light-distribution component 100 disclosed in the embodiment of the present application may further include a positioning portion 120, and the positioning portion 120 may be connected to the bottom of the light-distribution component body 110. The positioning portion 120 is configured to position and cooperate with the chassis 300 of the lighting fixture. Specifically, the positioning portion 120 may have a positioning groove 121, which may be positionally fitted with the substrate 310 protruding outward from the chassis 300. The substrate 310 is usually a PCB board. The substrate is configured to install the light-emitting units 200 while supplying power to the light-emitting units 200.

Figure 4:
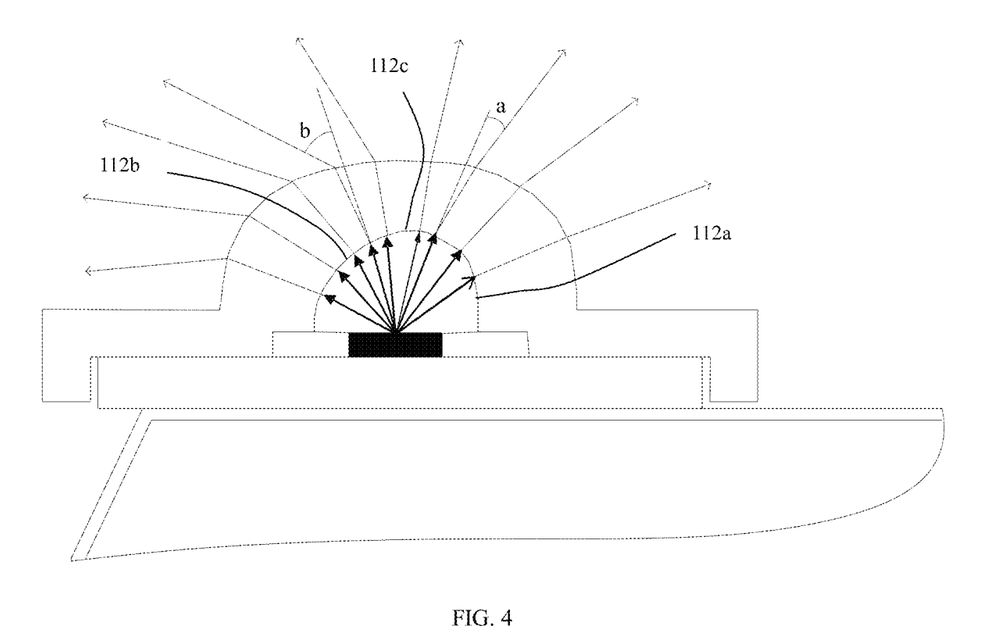
FIG. 4 is a schematic diagram of the deflection of the structure shown in FIG. 3 to the light.

Specifically, the bottom of the positioning groove 121 may be provided with a heat dissipation groove 122. The heat dissipation groove 122 may be located between the accommodation space 111 and the positioning groove 121 and communicate with the accommodation space 111. The light-emitting unit 200 may be located in the heat dissipation groove 122. The heat dissipation groove 122 can better dissipate heat for the light-emitting units 200. In a preferred scheme, in the extending direction from the inner side to the outer side of the light-distribution component 100, the width of the heat dissipation groove 122 may be larger than the width of the accommodation space 111, and a heat dissipation gap may be formed between the side wall of the heat dissipation groove 122 and the light-emitting units 200. This configuration can achieve better heat dissipation.

The light-distribution component 100 disclosed in an embodiment of the present application may further include at least one fastening part 130. The fastening part 130 is disposed on the light-distribution component body 110. Specifically, the fastening part 130 may be connected to the positioning portion 120. The fastening part 130 is configured to fasten the light-distribution component 100 to the chassis 300 of the lighting fixture.

Additionally or alternatively, a plurality of fastening parts 130 may be provided, and the plurality of fastening parts 130 can achieve a more balanced fastening between the light-distribution component 100 and the chassis 300. The plurality of fastening parts 130 may be distributed inside the light-distribution component body 110. In a specific embodiment, the light-distribution component 100 is a ring-shaped light-distribution component, and three fastening parts 130 may be provided. The three fastening parts 130 may be evenly distributed in the circumferential direction of the inner edge of the light-distribution component body 110. This application does not limit the specific number of the fastening parts 130.

The fastening part 130 may include a magnetic mounting element and/or a threaded connection member. The magnetic mounting element and/or the threaded connection member can be connected to the chassis 300 fixedly to realize the fastening of the light-distribution component 100.

The light-distribution component 100 can also be fastened to the chassis 300 in other ways. As described above, the light-distribution component 100 includes at least one fastening part 130 that can be disposed on the light-distribution component body 110, and the fastening part 130 can achieve a fastening connection with the chassis 300. Referring to FIG. 5 to FIG. 9, in a specific embodiment, the fastening part 130 may rotate relative to the chassis 300 to achieve a rotation snap-fit combination with the chassis 300. One of the fastening part 130 and the chassis 300 includes an elastic buckle 131, and the other one includes a snap-fit recess 320. The elastic buckle 131 and the snap-fit recess 320 are snap-fitted. During the installation process, the operator can achieve the fixed connection between the fastening part(s) 130 and the chassis 300 through the snap-fit between the elastic buckle 131 and the snap-fit recess 320. Each fastening part 130 may include an elastic buckle 131 and/or a snap-fit recess 320 for snap fitting and fixing with the chassis 300. One end of the fastening part 130 may be fixed on the light-distribution component body 110, and the other end is an elastic free end. The elastic free end includes an elastic buckle 131 or a snap-fit recess 320.

In a specific embodiment, the fastening part 130 may only be provided with an elastic buckle 131. Correspondingly, the chassis 300 may only be provided with a snap-fit recess 320, and the elastic buckle 131 and the snap-fit recess 320 are snap fitted to achieve the snap fitting of the light-distribution component 100 and the chassis 300.

In another specific embodiment, the fastening part 130 may only be provided with a snap-fit recess 320, and correspondingly, the chassis 300 may only be provided with an elastic buckle 131.

In yet another specific embodiment, the fastening part 130 may be provided with an elastic buckle 131 and a snap-fit recess 320, and the chassis 300 may also be provided with an elastic buckle 131 and a snap-fit recess 320, a snap-fit recess 320 of one of the fastening part 130 and the chassis 300 can be combined with the elastic buckle 131 of the other one of the fastening part 130 and the chassis 300 by the relative rotation of the light-distribution component 100 and the chassis 300 to realize the rotation snap-fit connection, thereby achieving the fixed assembly of the light-distribution component 100 and the chassis 300.

Referring to FIG. 9 again, the fastening part 130 may include a spare connection hole 133. The spare connection hole 133 is configured to be fastened to the chassis 300 by the threaded connection described above. In a preferred scheme, the fastening part 130 may include a snap-fit structure (an elastic buckle 131 or a snap-fit recess 320) and a spare connection hole 133. The user may choose from two ways of snap fitting and threaded connecting, or even use both of the two ways simultaneously. The fastening part 130 with this configuration can enable the light-distribution component 100 to be assembled with different chassis 300 with various fastening connection ways. For example, when the chassis 300 has only threaded connection holes, the light-distribution component 100 can be matched with the threaded connection holes through the threaded connection piece that matches with the spare connection hole 133, thereby achieving fastening assembly. When the chassis 300 has only the snap-fit recess 320, the light-distribution component 100 can be fixed to the snap-fit recess 320 by the elastic buckle 131, thereby achieving assembly.

In another specific embodiment, the fastening part 130 may include a mounting hole, and a magnetic member may be installed in the mounting hole, and the magnetic member may be fastened to the chassis 300 by suction. For example, when the chassis 300 is an iron chassis or the chassis 300 has an iron connection member, the light-distribution component 100 can be adsorbed and fixed to the chassis 300 by a magnetic member.

Similarly, the fastening part 130 may simultaneously have at least one of the mounting hole, the spare connection hole 133, and the snap-fit structure (elastic buckle 131 or a snap-fit recess 320), thereby enabling the light-distribution component 100 to be assembled fixedly with chassis 300.

This structure can better adapt the light-distribution component 100 to various chassis 300 with different assembly ways. Apparently, this can greatly improve the practicality of the light-distribution component 100.

Referring to FIGS. 5-9. In another scheme, in a lighting fixture to which the light-distribution component 100 disclosed in the embodiments of the present application is applied, the light-distribution mechanism of the lighting fixture may include a chassis 300 and a light-distribution component 100. The light-distribution component 100 includes a light-distribution component body 110 and at least one fastening part 130. The light-distribution component 100 can rotate relative to the chassis 300, and the fastening part 130 can rotate together with the light-distribution component 100. The fastening part 130 and the chassis 300 are connected by a rotational snap-fit.

One of the fastening part 130 and the chassis 300 includes an elastic buckle 131, and the other one may include a snap-fit recess 320. The elastic buckle 131 can rotate with the light-distribution component 100 to a position that is fixedly engaged with the snap-fit recess 320, and realize the fixed assembly of the light-distribution component 100 and the chassis 300.

During the assembly process in the above manner, the operator only needs to grasp the light-distribution component 100 so that the elastic buckle 131 snaps into the snap-fit recess 320, which can improve the assembly efficiency of the lighting fixtures. Of course, in the process of disassembly, it is only needed to disengage the elastic buckle 131 from the engaging recess 320 to realize disassembly. It can be seen that the above light-distribution mechanism can also improve the disassembly efficiency of the lighting fixtures.

In the above light-distribution mechanism, the fastening part 130 may include an elastic buckle 131, and the chassis 300 may include a snap-fit recess 320.

In a specific embodiment, the chassis 300 may include a guide recess 330 extending along the rotation direction of the fastening part 130. The guide recess 330 has a top opening, and the fastening part 130 extends into the guide recess 330 from the top opening and can follow the light-distribution component 100 rotates along the guide recess 330, and the light-distribution component 100 rotates relative to the chassis 300, thereby driving the fastening part 130 to rotate in the guide recess 330. The guide recess 330 has an open end, and the elastic buckle 131 can pass through the open end as the fastening part 130 rotates, and can be caught in the snap-fit recess 320 from the back of the chassis 300. It is to be noted that the chassis 300 includes a back surface and a front surface. The so-called back surface refers to a surface of the chassis 300 facing away from the light-distribution component 100, and the front surface refers to a surface of the chassis 300 facing the light-distribution component 100.

During the specific assembly process, the operator grasps the light-distribution component 100 so that the fastening part 130 is inserted from the top opening of the guide recess 330 into the guide recess 330, and then controls the light-distribution component 100 to rotate, thereby making the fastening part 130 turn in the guide recess 330, as the rotation progresses, the elastic buckle 131 will be unscrewed out from the open end of the guide recess 330 to enter the back side of the chassis 300, and as the rotation progresses, when the elastic buckle 131 is rotated to a position facing the snap-fit recess 320, the elastic buckle 131 enters the snap-fit recess 320 from the back of the chassis 300 under the action of its deformation elastic force, and finally achieves a fixed connection.

Figure 9:
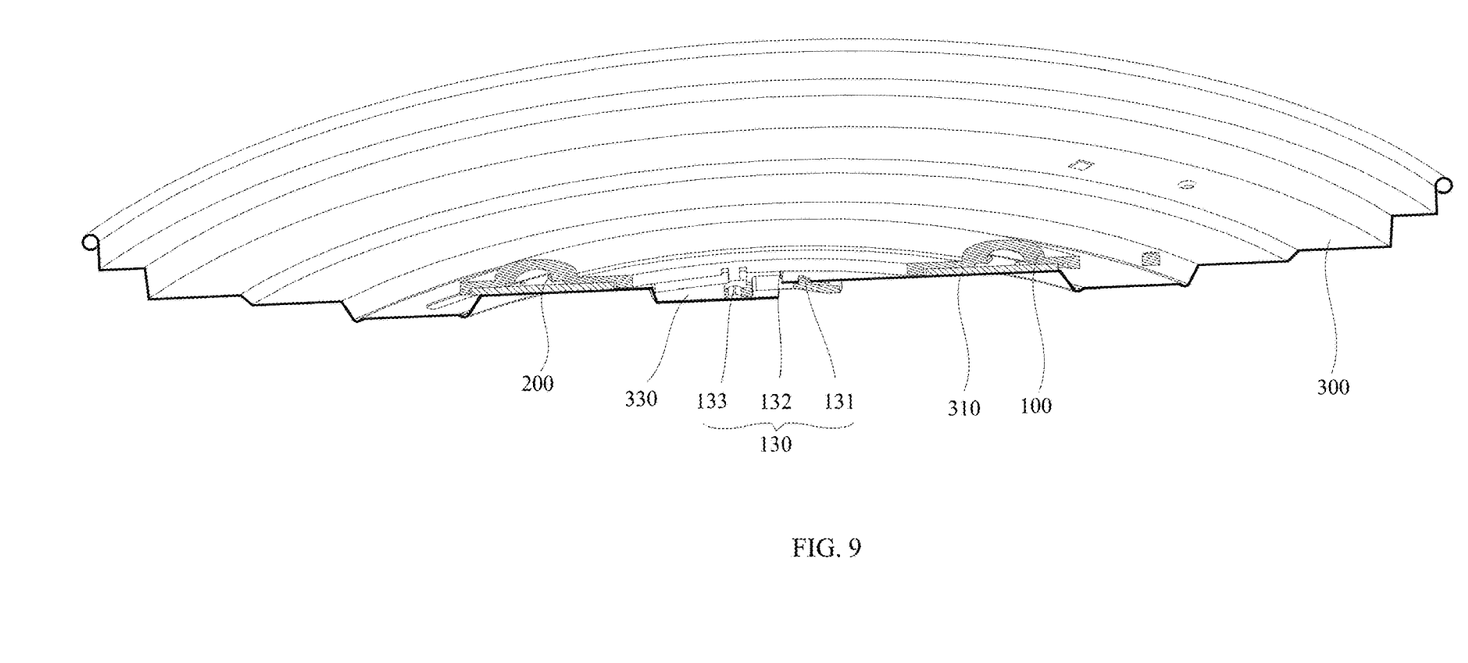
FIG. 9 is a cross-sectional view of FIG. 8 under a cross-section.

In a preferred scheme, the fastening part 130 may have a limiting portion 132 that is matched with the open end, as shown in FIG. 9. In the process of rotation, the limiting portion 132 will cooperate with the open end to limit the position. When the two are in the position of the limit-fitting position, the elastic buckle 131 is engaged with the snap-fit recess 320. The limiting portion 132 can prevent the fastening part 130 from rotating excessively and turning over the snap-fit recess 320, and can also avoid assembly failure.

In order to fool-proofing, in a preferred scheme, one end of the guide recess 330 is a closed end, and the other end is the open end described above. In order to improve the compactness of the fitting, the guide recess 330 is an arc-shaped channel, and the fastening part 130 is an arc-shaped member. During the rotation of the light-distribution component 100, the arc-shaped member rotates in the arc-shaped channel, which can ensure a large rotation stroke. Of course, this matching structure can ensure the stability of the rotation process.

During the disassembly process, the operator can operate the elastic buckle 131 to make it elastically deform, so that the elastic buckle 131 is detached from the snap-fit recess 320, and then rotate the light-distribution component 100 in a direction opposite to the installation rotation direction, to allow the elastic buckle 131 to be rotated to the guide recess 330 and moved out of the top opening of the guide recess 330.

In the embodiment of the present application, the snap-fit recess 320 may be a snap-fit slot or a snap-fit hole. In order to facilitate the disassembly operation of the operator, in a preferred scheme, the snap-fit recess 320 is a snap-fit hole that penetrates the chassis 300 in the thickness direction of the chassis. In this case, the operator can use a tool to push the elastic buckle 131 out of the snap-fit recess 320 from the front to the back of the chassis 300.

In order to facilitate the assembly or disassembly of the elastic buckle 131, in a preferred scheme, the elastic buckle 131 has a guiding slope, and the guiding slope is configured for the elastic buckle 131 sliding into or out of the snap-fit recess 320. The guide slope acts as a smooth guide.

In a preferred scheme, one end of the fastening part 130 is fixed to the light-distribution component body 110, and the other end of the fastening part 130 is an elastic free end, and the elastic free end includes an elastic buckle 131. The fastening part 130 is an elastic structure, which is more convenient for an operator to control the deformation of the elastic buckle 131, thereby facilitating the disassembly of the light-distribution component 100.

Figure 10:
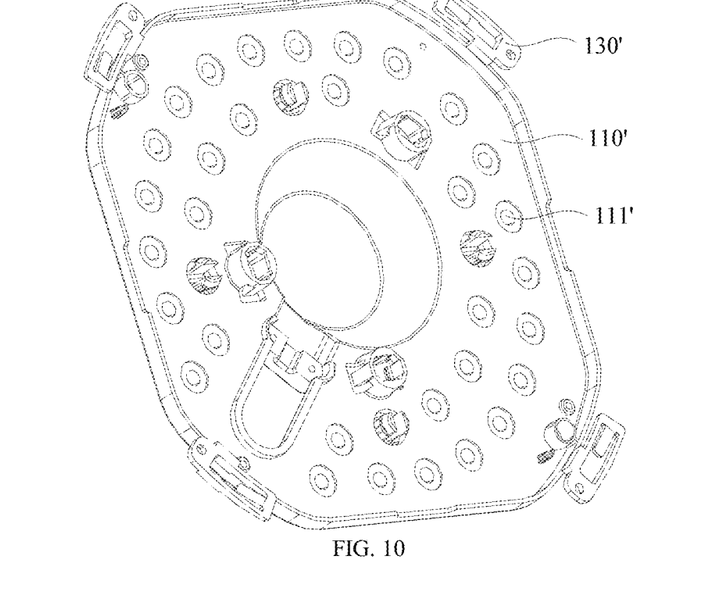
FIG. 10 is a schematically structural diagram of another light-distribution component disclosed in an embodiment of the present application.

As described above, the accommodation space of the light-distribution component body 110 may cover one light-emitting unit 200 or multiple light-emitting units 200. Referring to FIG. 10, FIG. 10 is a light-distribution component with another configuration. The light-distribution component body 110' of the light-distribution component has a plurality of accommodation spaces 111' arranged in an array, and each accommodation space 111' can cover one light-emitting unit, the distribution of the light-emitting units provided on the substrate of the lighting fixture is the same as the arrangement of the accommodation space 111', and can correspond one-to-one. The light-distribution component body 110' is provided with a fastening part 130', and the fastening part 130' may have a same structure as the fastening part 130 shown in FIGS. 1-9. The light-distribution component shown in FIG. 10 can also be rotated relative to the chassis of the lighting fixture to which it is applied, and then the fixed part 130' is connected with the chassis fixedly by rotation snap-fit of the fastening part 130' and the chassis.

Figure 11:
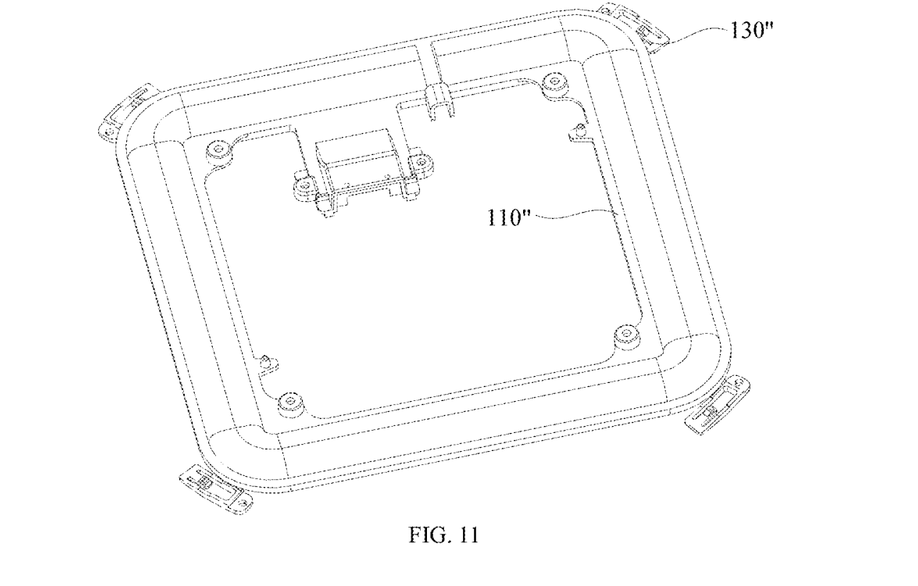
FIG. 11 and FIG. 12 are schematically structural diagrams of yet another light-distribution component disclosed in embodiments of the present application from different perspectives.
Figure 12:
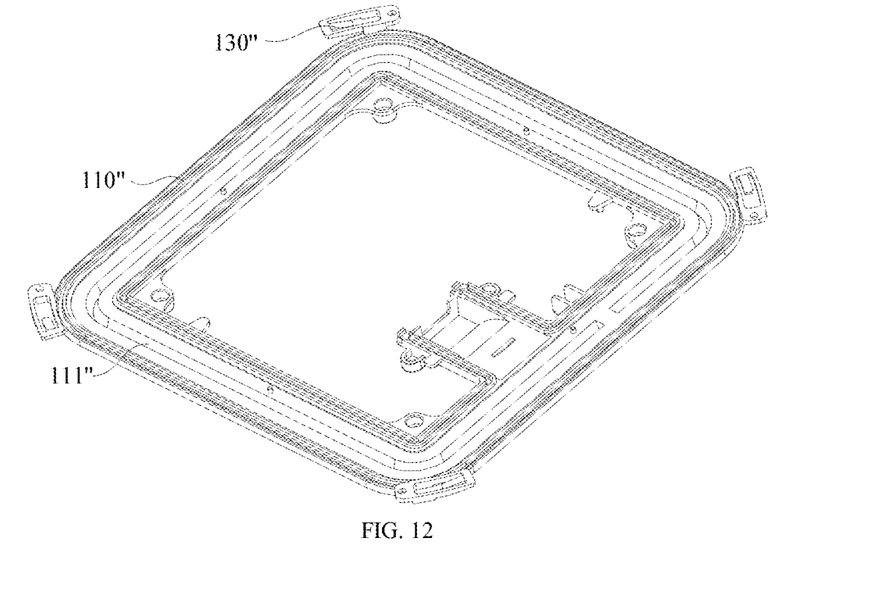

As described above, the light-distribution component 100 may be a ring-shaped light-distribution component. Of course, the light-distribution component 100 may also have other shapes. Referring to FIGS. 11 and 12. The light-distribution component may be a square structure. The accommodation space 111" of the light-distribution component body 110" may be a square accommodation space, and the square accommodation space may cover at least two light-emitting units 200. The light-distribution unit body 110" may be provided with a fastening part 130", and the fastening part 130" may have a same structure as the fastening part 130 or the fastening part 130' shown in FIGS. 1-10. The light-distribution component shown in FIGS. 11-12 can also rotate relative to the lamp holder of the lighting fixture to which it is applied, and the light-distribution component and the chassis can be fixedly connected by the snap-fit connection of the fixed portion 130" and the chassis.

In the embodiment of the present application, the light-distribution component 100 may be a ring lens, a ring diffusion mask, or the like, which can realize light-distribution for lighting fixture and light projected by the light-emitting unit 200 can pass the light-distribution component.

In the lighting fixture to which the light-distribution component 100 disclosed in the embodiments of the present application is applied, the light source module of the lighting fixture may include a substrate 310, a light-distribution component 100, and at least two light-emitting units 200, in which the light-distribution component 100 is the light-distribution component 100 as described in the above embodiments, the substrate 310 is fixed on the light-distribution component 100, and at least two light-emitting units 200 are provided on the substrate 310 and arranged in the accommodation space 111 of the light-distribution component 100.

In a preferred scheme, on the premise that the light-distribution component 100 is a ring-shaped light-distribution component, at least two light-emitting units 200 may be discretely and uniformly arranged in the accommodation space 111, thereby achieving more uniform light emission.

Figure 5:
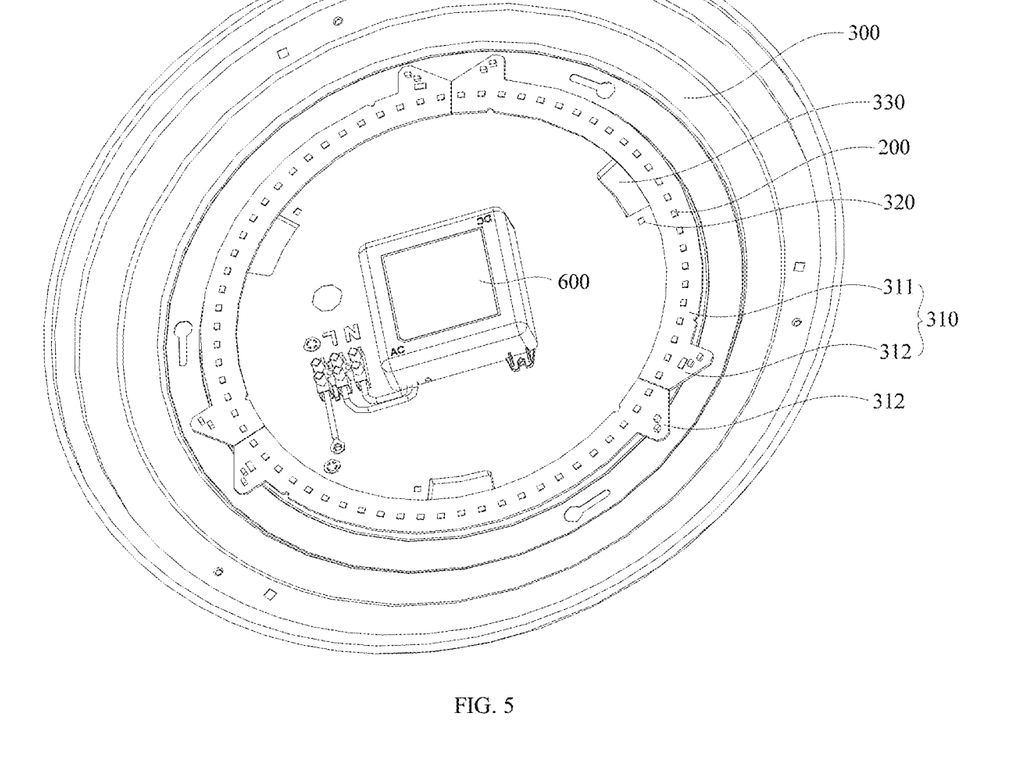
FIG. 5 is a partially structural schematic diagram of a lighting fixture disclosed in an embodiment of the present application.
Figure 6:
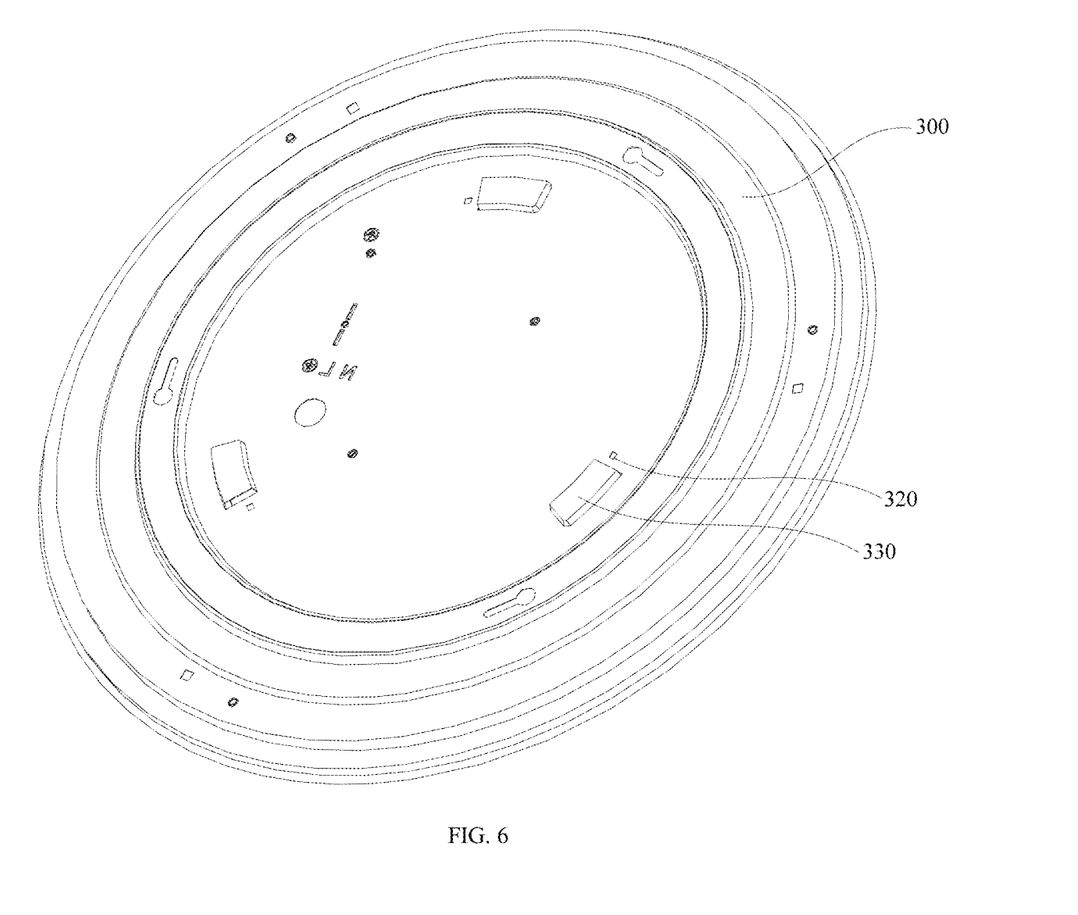
FIG. 6 is a schematically structural diagram of a chassis in the lighting fixture shown in FIG. 5.
Figure 7:
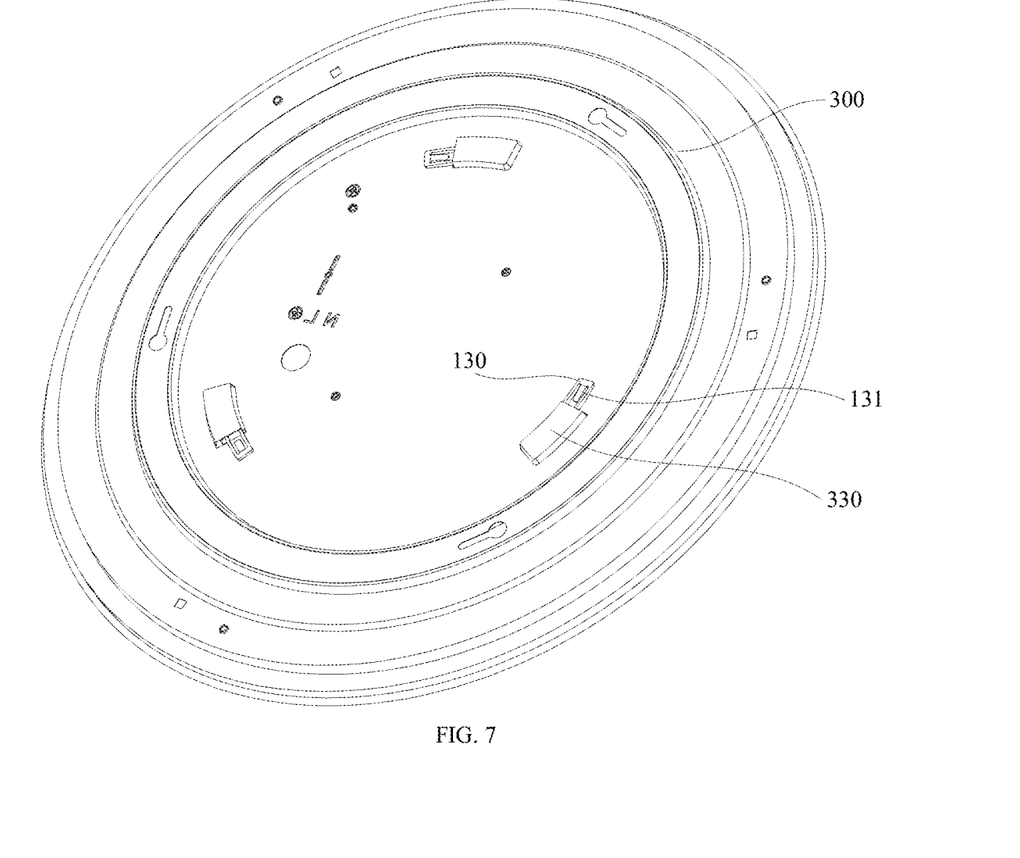
FIG. 7 is a schematically structural view of the chassis and the light-distribution component after assembly.
Figure 8:
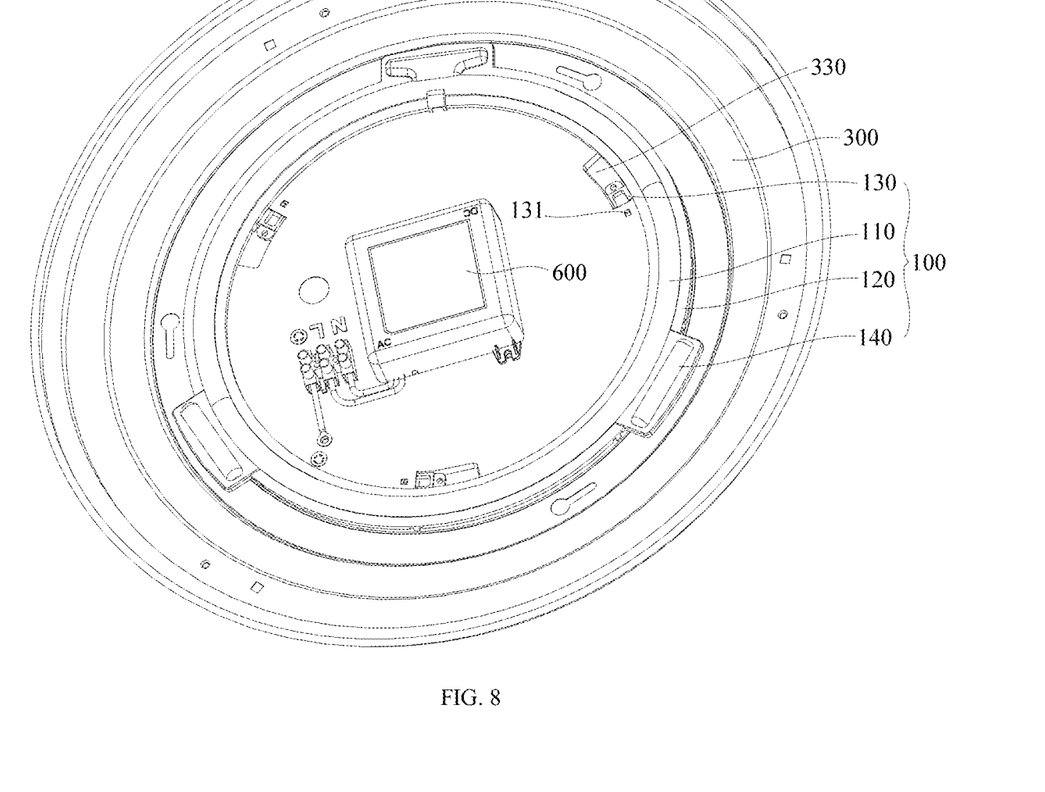
FIG. 8 is a schematically structural view of FIG. 7 from another perspective.

The substrate 310 is the basis for mounting the light-emitting units 200 and supplies power to the light-emitting units 200. Generally, the substrate 310 is a PCB board. Specifically, the substrate 310 is a substrate with an integrated structure, which can better adapt to the light-emitting units 200 distributed in the accommodation space 111. Generally, in order to simplify manufacturing, the substrate 310 may include a plurality of sub-substrates 311, and the plurality of sub-substrates 311 are butted to each other to form the entire substrate. When the light-distribution component 100 is a ring-shaped light-distribution component, the substrate 310 is a ring-shaped substrate, which can better adapt to at least two light-emitting units 200 distributed in a ring shape. Correspondingly, the substrate 310 may include at least two sub-substrates 311 with an arc-shaped structure, and the at least two sub-substrates 311 are abutted one by one to form a ring structure, thereby providing a mounting basis for at least two light-emitting units 200, as shown in FIG. 5.

Dividing the substrate 310 into at least two sub-substrates 311 can facilitate the installation and local maintenance of the substrate 310, at the same time, it can save plate material by using at least two sub-substrates 311.

Figure 2:
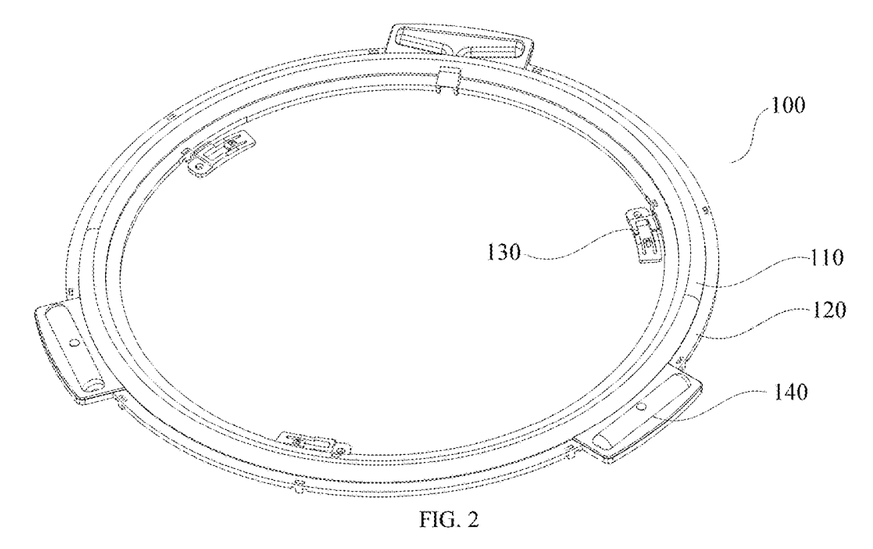
FIG. 2 is a schematically structural diagram of a light-distribution component disclosed in an embodiment of the present application.

Referring to FIG. 2 and FIG. 5 again, to facilitate the electrical connection of the at least two sub-substrates 311, in the present application, at least two lugs 140 protruding outward from the edge of the light-distribution component 100 may be provided on the outer side of the light-distribution component 100. On the premise that the light-distribution component 100 is a ring-shaped light-distribution component, the lugs 140 may protrude radially outward of the light-distribution component body 110 and protrude from the outer edge of the light-distribution component body 110, and each junction of two adjacent sub-substrates 311 includes an electrical connection portion 312 protruding outwardly. The protruding outwardly refers to protruding outward of the sub-substrate 311. The lugs 140 can cover the electrical connection portions 312. Specifically, each electrical connection portion 312 may be a wire, a solder layer, an electrical connector, etc., and the specific type of the electrical connection portions 312 is not limited in this application. Here, the so-called covering refers to the projection of the electrical connection part 312 falls in the projection range of the corresponding lug 140 in the projection plane perpendicular to the chassis 300, which can protect the electrical connection parts 312, and improve the appearance of the lighting fixture after it is assembled.

The arrangement of the lugs 140 can guide the electrical connection of the adjacent two sub-substrates 311 to one side of the substrate 310 without causing the joint of the two adjacent sub-substrates 311 to be occupied, thereby enabling the substrate 310 to have more space to arrange the light-emitting units 200.

Specifically, three lugs 140 may be provided, and the three lugs 140 may be discretely and uniformly arranged on the outer edge of the light-distribution component 100.

Similarly, the light-distribution component 100 disclosed in the embodiments of the present application may include multiple sub-light-distribution portions, and the multiple sub-light-distribution portions may be jointed to form the entire light-distribution component 100. On the premise that the light-distribution component 100 is a ring-shaped light-distribution component, the light-distribution component 100 may include a plurality of arc-shaped sub-light-distribution portions, and a plurality of arc-shaped sub-light-distribution portions may be joined to form a ring-shaped light-distribution component.

Based on the light-distribution component 100 disclosed in the embodiments of the present application, in a lighting fixture to which the light-distribution component 100 disclosed in the embodiments of the present application is applied, the light source assembly of the lighting fixture may include a chassis 300 and the light source module described above, in which, the substrate 310 is fixed on the light-distribution component 100, and the light-distribution component 100 and the chassis 300 can be combined by rotating snap-fit buckle, thereby achieving the fixed assembly of the light-distribution component 100 and the chassis 300.

Referring to FIGS. 1-8 together, based on the light source module described above, an embodiment of the present application also discloses a lighting fixture. The disclosed lighting fixture includes a chassis 300, a driver 600, a lampshade 400, and the light source module described above, the substrate 310 of the light source module being fixedly connected to the light-distribution component 100. The driver 600 is electrically connected to the substrate 310, and drives the light-emitting units 200 to start after being powered on. The lampshade 400 is fixed on the chassis 300 and forms a light mixing cavity 500 with the chassis 300. The chassis 300 and the light-distribution component 100 can rotate relatively to each other to achieve a snap-fit. Specifically, one of the chassis 300 and the light-distribution component 100 includes an elastic buckle 131, and the other one is provided with a snap-fit recess 320. The elastic buckle 131 and the snap-fit recess 320 follow the relative rotation of the light-distribution component 100 and the chassis 300 to achieve a snap-fit connection.

The driver 600 may be disposed in the center of the chassis 300 and within the region of the light-distribution component 100. Of course, the driver 600 may not be provided in the center of the chassis 300, but may be provided outside the light-distribution component 100. Generally, on the premise that the light-distribution component 100 is a ring-shaped light-distribution component, the driver 600 may be disposed in the area enclosed by the ring-shaped light-distribution component. Additionally or alternatively, the driver 600 may be located in the center of the area enclosed by the ring-shaped light-distribution component.

Based on the light-distribution mechanism described above, an embodiment of the present application also discloses a lighting fixture. The disclosed lighting fixture includes a lampshade 400, a substrate 310, a driver, a plurality of light-emitting units 200, and the light-distribution structure described above. The substrate 310 is fixedly connected to the light-distribution unit 100, the driver is electrically connected with the substrate 310, the lampshade 400 is fixed on the chassis 300 and forms a light mixing cavity with the chassis 300, and both the light-distribution structure and the driver are disposed in the light mixing cavity.

Figure 1:
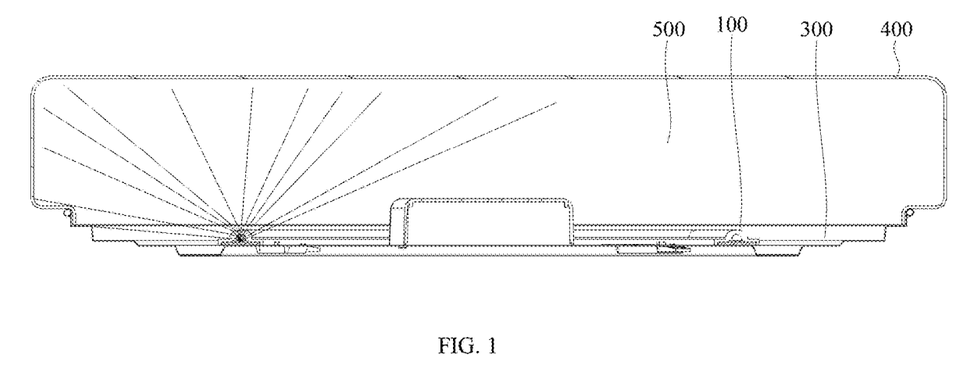
FIG. 1 is a schematically structural diagram of a lighting fixture disclosed in an embodiment of the present application.

In the lighting fixture disclosed in the embodiment of the present application, the cover surface of the lampshade 400 opposite to the light projection direction of the light source module (which may also be regarded as the light projection direction of the light-emitting units 200) may be a flat surface, as shown in FIG. 1, or may be commonly used curved surface. On the premise that the cover surface is an arc-shaped surface, in a preferred scheme, a distance between the vertex of the arc-shaped surface and a plane where the light-emitting centers of at least two light-emitting units are located is a first distance, an edge height of the lampshade 400 is a second distance, then the first distance and the second distance satisfy the following relationship: $A \geq B \geq 0.9A$, where A is the first distance and B is the second distance. After verification, under the above relationship, the lighting fixture disclosed in the present application has better uniformity.

In the embodiments of the present application, the light-emitting units 200 may be LED lamps. The LED lamps have advantages of low energy consumption, long service life, and stable light emission.

In the present application, the shape of the lighting fixture may be round, square, irregular polygon, etc., which is not limited in this application.

Additionally or alternatively, in the ring-shaped light-distribution component, both the light incident surface and the light emergent surface are curved surfaces.

Additionally or alternatively, in the ring-shaped light-distribution component, a radius of curvature of the inner light incident surface is smaller than a radius of curvature of the outer light incident surface.

Additionally or alternatively, in the ring-shaped light-distribution component, the light emergent surface is a symmetric curved surface.

Additionally or alternatively, in the ring-shaped light-distribution component, the light incident surface has a top portion boundary at a maximum distance from the light-emitting unit, and a region of the light incident surface inside the top portion boundary is the inner light incident surface, and a region of the light incident surface outside the top portion boundary is the outer light incident surface.

Additionally or alternatively, in the ring-shaped light-distribution component, the top portion boundary is located inside a same circle where optical axes of all the light-emitting units are located, and the top portion boundary is distributed concentrically with the circle, and a distance between the top portion boundary and the circle is a given distance, the given distance being greater than zero.

Additionally or alternatively, in the ring-shaped light-distribution component, the light emergent surface is provided with a light diffusion pattern.

Additionally or alternatively, in the ring-shaped light-distribution component, the annular light-distribution element is an integral structural member.

Additionally or alternatively, in the ring-shaped light-distribution component, the ring-shaped light-distribution component further comprises a positioning portion, the positioning portion being connected with the light-distribution component body, and configured for positionally fitting with a chassis of a lighting fixture.

Additionally or alternatively, in the ring-shaped light-distribution component, the positioning portion has a positioning groove for positionally fitting with a substrate protruding outward from the chassis.

Additionally or alternatively, in the ring-shaped light-distribution component, a heat dissipation groove is provided at a bottom of the positioning groove, the heat dissipation groove being located between the ring-shaped accommodation space and the positioning groove and communicating with the ring-shaped accommodation space, and at least two of the light-emitting units being located in the heat dissipation groove.

Additionally or alternatively, in the ring-shaped light-distribution component, in a radial direction of the ring-shaped light-distribution component, the heat dissipation groove has a width larger than a width of the ring-shaped accommodation space, and a heat dissipation gap is formed between a side wall of the heat dissipation groove and the light-emitting units.

Additionally or alternatively, in the ring-shaped light-distribution component, it further comprises at least one fastening part provided on the light-distribution component body, the fastening part being configured for fastening with a chassis of a lighting fixture.

Additionally or alternatively, in the ring-shaped light-distribution component, the fastening part comprises a magnetic mounting member or a threaded connection member, the magnetic mounting member or the threaded connection member being configured for fastening with the chassis.

Additionally or alternatively, in the ring-shaped light-distribution component, the fastening part is configured for combining with the chassis of the lighting fixture by a rotatable snap-fit connection, and the fastening part including an elastic buckle and/or a snap-fit recess for clamping and fastening with the chassis.

Additionally or alternatively, in the ring-shaped light-distribution component, the ring-shaped light-distribution component is a ring lens or a ring diffusion mask.

A light source module comprises: a substrate, a ring-shaped light-distribution component, and at least two light-emitting units, the ring-shaped light-distribution component being the ring-shaped light-distribution component above mentioned, the at least two light-emitting units being provided on the substrate, and being arranged in the ring-shaped accommodation space along the circumference of the ring-shaped light-distribution component.

Additionally or alternatively, in the above light source module, the at least two light-emitting units are discretely and uniformly arranged in the ring-shaped accommodation space.

Additionally or alternatively, in the light source module, the substrate is a ring-shaped substrate with an integrated structure; or the substrate comprises at least two sub-substrates with a circular arc structure, the at least two sub-substrates being connected one by one to form a ring structure.

Additionally or alternatively, in the light source module, at least two lugs protruding outward in a radial direction of the ring-shaped light-distribution component are provided on an outside of the ring-shaped light-distribution component, a joint of any two adjacent sub-substrates comprises convex electrical connection parts, and the lugs cover the electrical connection parts.

Additionally or alternatively, in the light source module, teach electrical connection part is a wire, a solder layer or an electrical connector.

A light source assembly characterized in that it comprises a chassis and a light source module mounted on the chassis, the light source module being the light source module of any one mentioned above, the substrate is fixed on the ring-shaped light-distribution component, and the ring-shaped light-distribution component is fixedly connected to the chassis.

Additionally or alternatively, in the light source assembly, the ring-shaped light-distribution component includes at least one fastening part provided on the light-distribution component body, the fastening part includes an elastic buckle or a snap recess; the chassis includes a snap-fit recess cooperating with the elastic buckle of the fastening part, or an elastic snap-fit cooperating with the snap-fit recess of the fastening part; the elastic buckle and the snap-fit recess achieve clamping and fastening by respectively following a relative rotation of the ring-shaped light-distribution component and the chassis.

A lighting fixture comprises a chassis, a driver, a lampshade and the light source module mentioned above, the substrate being fixedly connected to the chassis, the driver being electrically connected with the substrate, the lampshade being fixed on the chassis and forming a light mixing cavity with the chassis, and the light source module and the driver being disposed in the light mixing cavity.

Additionally or alternatively, in the lighting fixture, the driver is disposed in the center of the chassis and within an annular region of the ring-shaped light-distribution component.

Additionally or alternatively, in the lighting fixture, a cover surface of the lampshade opposite to a light projection direction of the light source module is a convex arc surface.

Additionally or alternatively, in the lighting fixture, a distance between a vertex of the arc surface and a plane where light-emitting centers of the at least two light-emitting units being a first distance, an edge height of the lampshade being a second distance, and the first distance and the second distance satisfying the following relationship: $A \geq B \geq 0.9A$, where A is the first distance, and B is the second distance.

The at least one technical scheme adopted in this application can achieve the following beneficial effects.

In the ring-shaped light-distribution component disclosed in the present application, the light-distribution component body cover is provided on at least two light emitting units, and the light emitted by the light-emitting units enters the light-distribution component body from the light incident surface. The first deflection angle of light deflected by a portion of the light-distribution component body corresponding to the inner light incident surface is small, while the second deflection angle of light deflected by a portion of the light-distribution component body corresponding to the outer light incident surface is large. In this case, more of the light rays will be projected away from the edge of the center of the ring-shaped light-distribution component, so that the light concentrated in the center of the ring-shaped light-distribution component is less, which can improve the light emission uniformity of the lighting fixture, thereby reducing the brightness difference formed after the light passes through the ring-shaped light-distribution component.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the apparatus or system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Herein, without conflicting with each other, the technical features in each of the preferred schemes can be combined to form a scheme, which is fall in the scope disclosed in the present application.

Herein, each of the preferred schemes only focuses on the differences from other preferred schemes. Without conflicting with each other, the preferred schemes can be combined arbitrarily. The combined embodiments also fall in the scope of this specification, for the conciseness of text, the embodiments formed by the combination will not be described separately herein.

The described above are only embodiments of the present application, and are not intended to limit the present application. For those skilled in the art, the present application may have various modifications and changes. Any modification, equivalent substitution, improvement, etc. made within the spirit and principle of this application shall fall in the scope of the claims of this application.

What is claimed is:

1. A ring-shaped light-distribution component, comprising:
a light-distribution component body having a ring-shaped accommodation space and a light incident surface and a light emergent surface that are respectively located on two sides of the light-distribution component body,
wherein the ring-shaped accommodation space is configured to accommodate at least two light-emitting units distributed along a circumference of the ring-shaped accommodation space,
wherein an inner wall of the ring-shaped accommodation space is the light incident surface,
wherein the light incident surface comprises an inner light incident surface near a center of the ring-shaped light-distribution component and an outer light incident surface away from the center, wherein the center is a point outside of a ring formed by the ring-shaped light-distribution component but surrounded equilaterally by the ring, and the light incident surface comprises a top portion boundary at a maximum distance from the light-emitting units and the top portion boundary on the light incident surface forms a first circle, optical axes of all the light-emitting units in the ring-shaped accommodation space form a second circle, the first circle is concentrically located inside the second circle, a distance between the first circle and the second circle along a radial direction is a given distance, the given distance being greater than zero,
wherein a first deflection light that is projected by the light-emitting unit and deflected by a portion of the light-distribution component body corresponding to the inner light incident surface defines a first deflection angle,
wherein a second deflection light deflected by a portion of the light-distribution component body corresponding to the outer light incident surface defines a second deflection angle, and the first deflection angle is smaller than the second deflection angle, and
wherein the inner light incident surface and the outer light incident surface are continuously curved.

2. The ring-shaped light-distribution component according to claim 1, wherein the ring-shaped light-distribution component further comprises a positioning portion, and the positioning portion is connected to the light-distribution component body and configured for fitting with a chassis of a lighting fixture.

3. The ring-shaped light-distribution component according to claim 2, wherein the positioning portion has a positioning groove for positionally fitting with a substrate protruding outward from the chassis.

4. The ring-shaped light-distribution component according to claim 3, wherein a heat dissipation groove is provided at a bottom of the positioning groove, the heat dissipation groove is located between the ring-shaped accommodation space and the positioning groove and communicates with the ring-shaped accommodation space, and the at least two of the light-emitting units are located in the heat dissipation groove.

5. The ring-shaped light-distribution component according to claim 4, wherein, in a radial direction of the ring-shaped light-distribution component, the heat dissipation groove has a width larger than a width of the ring-shaped accommodation space, and a heat dissipation gap is formed between a side wall of the heat dissipation groove and the light-emitting units.

6. A light source module, comprising:
a substrate, a ring-shaped light-distribution component and at least two light-emitting units, the ring-shaped light-distribution component being the ring-shaped light-distribution component according to claim 1, and the at least two light-emitting units being provided on the substrate and being arranged in the ring-shaped accommodation space along the circumference of the ring-shaped light-distribution component.

7. The light source module according to claim 6, wherein the substrate comprises at least two sub-substrates with a circular arc structure, and the at least two sub-substrates is connected one by one to form a ring structure.

8. The light source module according to claim 7, wherein at least two lugs protruding outward in a radial direction of the ring-shaped light-distribution component are provided on an outside of the ring-shaped light-distribution component, a joint of any two adjacent sub-substrates comprises electrical connection parts, and the lugs cover the electrical connection parts.

9. A lighting fixture, comprising a chassis, a driver, a lampshade and the light source module of claim 6, the substrate being fixedly connected to the chassis, the driver being electrically connected with the substrate, the lampshade being fixed on the chassis and forming a light mixing cavity with the chassis, and the light source module and the driver being disposed in the light mixing cavity.

10. The lighting fixture of claim 9, wherein the driver is disposed in the center of the chassis and within an annular region of the ring-shaped light-distribution component.

11. The light source module according to claim 6, wherein the substrate is a ring-shaped substrate with an integrated structure.

12. The ring-shaped light-distribution component according to claim 1, wherein a radius of curvature of the inner light incident surface is smaller than a radius of curvature of the outer light incident surface.

13. The ring-shaped light-distribution component according to claim 12, wherein the light emergent surface is a symmetric curved surface.

14. The ring-shaped light-distribution component according to claim 12, wherein a region of the light incident surface inside the top portion boundary is the inner light incident surface, and a region of the light incident surface outside the top portion boundary is the outer light incident surface.

15. The ring-shaped light-distribution component according to claim 1, further comprising at least one fastening part provided on the light-distribution component body, the fastening part being configured for fastening with a chassis.

16. The ring-shaped light-distribution component according to claim 15, wherein the fastening part is configured for combining with the chassis by rotatable snap connection, and the fastening part including an elastic buckle and/or a snap-fit recess configured for clamping and fastening with the chassis.

17. The ring-shaped light-distribution component according to claim 1, wherein the light emergent surface is provided with a light diffusion pattern.

* * * * *